(12) United States Patent
Bartle

(10) Patent No.: US 11,304,281 B2
(45) Date of Patent: Apr. 12, 2022

(54) INTELLIGENT DUSK DETECTION FOR AUTOMATIC LIGHT CONTROLLER

(71) Applicant: OPEN PLATFORM SYSTEMS, LLC, Garden City, ID (US)

(72) Inventor: David Alan Bartle, Garden City, ID (US)

(73) Assignee: OPEN PLATFORM SYSTEMS, LLC, Garden City, ID (US)

( * ) Notice: Subject to any disclaimer, the term of this patent is extended or adjusted under 35 U.S.C. 154(b) by 0 days.

(21) Appl. No.: 16/875,982

(22) Filed: May 15, 2020

(65) Prior Publication Data

US 2020/0367340 A1 Nov. 19, 2020

Related U.S. Application Data

(60) Provisional application No. 62/848,365, filed on May 15, 2019.

(51) Int. Cl.
*H05B 47/11* (2020.01)
*H05B 47/115* (2020.01)
*H05B 45/10* (2020.01)

(52) U.S. Cl.
CPC ............. *H05B 47/11* (2020.01); *H05B 45/10* (2020.01); *H05B 47/115* (2020.01)

(58) Field of Classification Search
CPC ........ H05B 47/11; H05B 47/115; H05B 47/10
See application file for complete search history.

(56) References Cited

U.S. PATENT DOCUMENTS

| | | | |
|---|---|---|---|
| 2010/0269383 A1* | 10/2010 | Nifenecker | H05B 45/325 40/541 |
| 2012/0306377 A1* | 12/2012 | Igaki | F21V 23/0471 315/151 |
| 2015/0084520 A1* | 3/2015 | Reed | H05B 47/16 315/152 |
| 2017/0277149 A1* | 9/2017 | Huang | G05B 19/042 |

* cited by examiner

*Primary Examiner* — Raymond R Chai
(74) *Attorney, Agent, or Firm* — Shaver & Swanson, LLP; Scott D. Swanson

(57) ABSTRACT

An improved luminaire configured to detect dawn and dusk and to turn on, dim and/or turn off in response to the ambient light level. The luminaire is configured to delay turning on, dimming, and/or turning off such that light emitted by the luminaire can be utilized by neighboring luminaires in calculating the ambient light level in determining if dawn, dusk, or other low light condition has begun or is ending. The luminaires further utilize a timer for measuring the ambient light so as to avoid momentary or brief ambient light changes caused by, for example, weather conditions or temporarily reflected light such as by a vehicle positioned proximate to on or more of the luminaires.

8 Claims, 2 Drawing Sheets

INTELLIGENT DUSK DETECTION FOR AUTOMATIC LIGHT CONTROLLER

PRIORITY/CROSS-REFERENCE TO RELATED APPLICATIONS

This application claims the benefit of U.S. Provisional Application No. 62/848,365, filed May 15, 2020 the disclosure of which is incorporated by reference.

TECHNICAL FIELD

The disclosure generally relates to the field of lighting control. Particular embodiments relate to an intelligent light source and method for detecting dawn and dusk and controlling lighting in accordance thereto.

BACKGROUND

Light controllers that utilize dusk detection in various daylight control methodology (e.g. dusk to dawn control, part night lighting control, etc.) can be affected by light contribution from the luminaire the controller is installed in, or other nearby luminaires. In worst case scenarios, the controller will cycle the luminaire on and off because the light contribution from turning the luminaire on at dusk will provide enough light to fool the light controller into thinking that dawn has arrived. Contribution from nearby luminaires (e.g. multiple lighting heads on a single pole) can further confuse the light controller.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a new method, controller configuration, and light assembly configured to provide enhanced detection of dawn and dusk events, or other events in which environmental lighting is reduced such as weather related events including, but not limited to, storms, in order to correctly turn on the lighting in low light conditions, control of dimming of the lighting dependent on lighting conditions, and turning off the lighting at the appropriate time based on environmental lighting.

Several techniques are used to ensure that the dusk detection event occurs only once a day, i.e. the controller does not falsely detect a dawn event and reset the dusk detection methodology. The techniques used are as follows:

Require several consecutive interval readings of the ambient light sensor to be at or below the dusk level to qualify the dusk event. Any reading that exceeds the dusk level resets the interval counter.

Provide an adjustable interval counter. This increases the period required to qualify the dusk event.

Provide hysteresis for qualifying the dawn event. The controller requires that the dawn ambient light threshold exceed the dusk ambient light threshold.

Record the ambient light contribution of the luminaire when it is turned on at dusk. Add this contribution to the ambient light threshold required to qualify a dawn event.

The light controller supports two output levels for the luminaire—full brightness and standby (or dimmed) brightness. The usage scenario is when motion is detected the luminaire will be brought to full brightness, then after a period the luminaire will be dimmed. Because the light could be at full or dimmed brightness at dawn, the ambient light contribution from the luminaire at both output levels is measured.

The ambient light contribution from the luminaire is measured at every dusk event to ensure highest accuracy. For example, if a truck with a white roof parked under the fixture for the night the controller would compensate for the additional light contribution from the reflected light.

Further enhancements to the disclosed method and controller configuration can be made for the scenario where multiple independently controller luminaires are mounted in locations where their light contribution can affect the dusk and dawn detection of the neighboring controllers. The state machine diagram shown in the figures provides a temporal and logical view of the techniques used. In summary, these are as follows:

Use time delays for transitions to turn the luminaire on at dusk to ensure all neighboring fixtures are on before measuring the collective light contribution.

Characterize the typical difference in time of day for dusk detection with luminaires mounted together; for example two or more luminaires on a parking lot pole.

Similarly, use time delay at dawn to ensure all fixtures are on when measuring light level for the dawn transition to off.

Provide adjustable parameters for tuning the time delays and other control variables in the control method state machine.

In a further embodiment the above method and luminaire utilizes a wireless enabled controller (such as a Bluetooth enabled controller) configured to run a multirole mode—central and peripheral (i.e. listener and broadcaster). This controller can be configured to advertise its state to allow neighboring lights to know if a neighbor has turned on. Preferably in this case the first controller advertising would cause the neighboring controllers to turn on—after a short time delay each controller could make the necessary contributed light level measurements for use in the dawn qualification. This would synch all the controllers to the first one to qualify dusk and dawn, eliminating potentially erroneous independent operation. What is further disclosed is a LED light having a controller. The controller is configured for communication with a sensor. The sensor is configured to detect ambient light. The controller is configured to detect dusk and dawn pursuant to the above techniques 1-6. Further disclosed is a plurality of independently controlled luminaires can be configured with a controller and a sensor that are configured in accordance with the above description. The controller of each light can be configured with a transceiver capable of communicating wirelessly with a transceiver of neighboring lights.

What is further disclosed is a LED light having a controller. The controller is configured for communication with a sensor. The sensor is configured to detect ambient light. The controller is configured to detect dusk and dawn pursuant to the above techniques 1-6. Further disclosed is a plurality of independently controlled luminaires that are configured with a controller and a sensor that are configured in accordance with the above description. The controller of each light can be configured with a transceiver capable of communicating wirelessly with a transceiver of neighboring lights. The transceiver is configured to communicate between luminaires to synchronize dawn and dusk adjustment between luminaires.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

Figure 1:
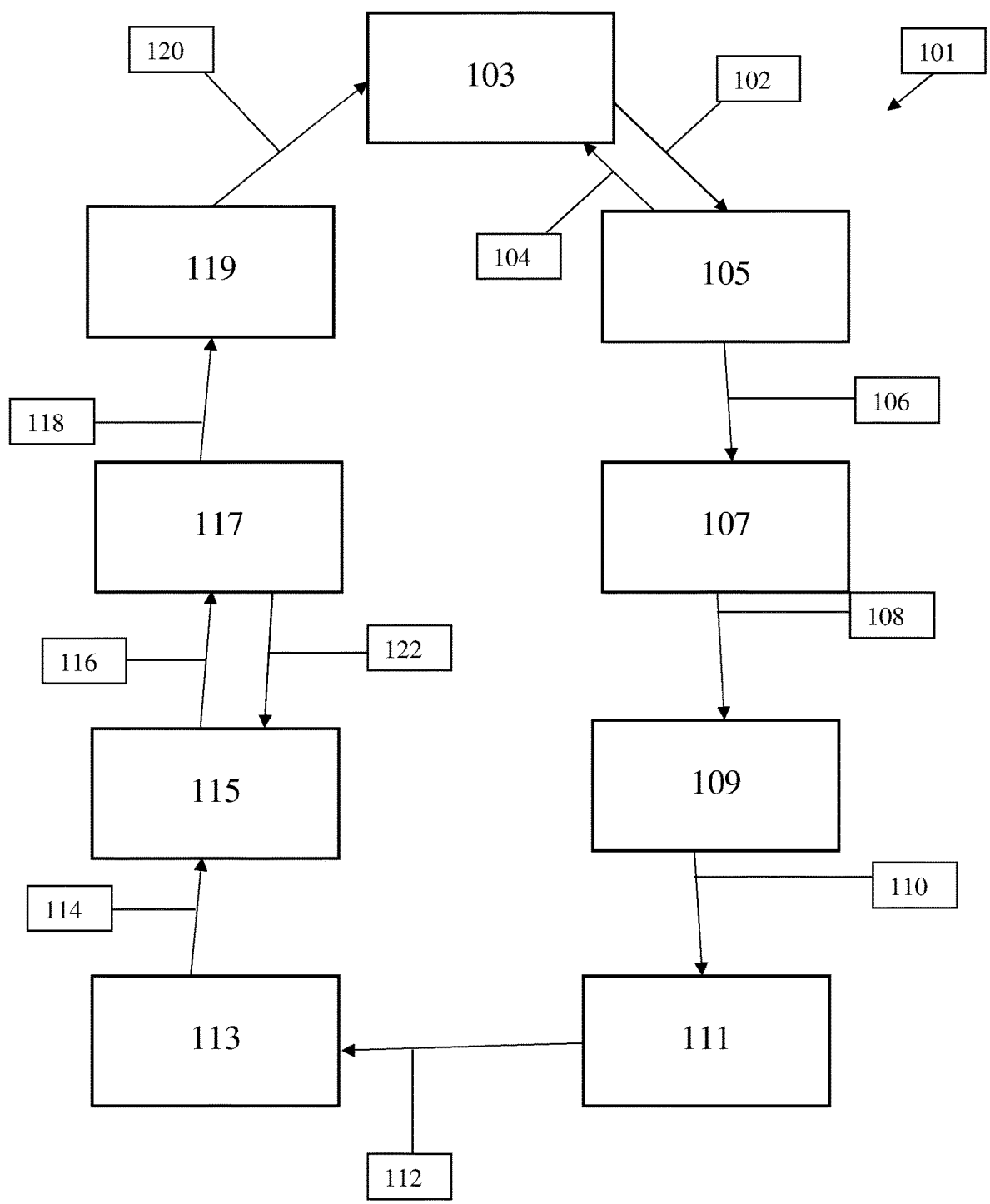
FIG. 1 illustrates a logic flow chart of a process of controlling light illumination at dusk, dawn, and other low light conditions.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a logic flow chart by which a smart luminaire assesses when to illuminate, at what brightness, and for what period of time. The flow chart illustrates a luminaire in the off position 103, typically during a high light time period such as mid-day. The luminaire is connected to or has an integral ambient light sensor. If the luminaire senses 102 a light level at less than a programmed threshold for dusk, the luminaire enters a Dusk Qualify state 105. During the Dusk Qualify state the luminaire utilizes a programmed timer to determine if the light level remains at a level less than the programmed threshold for dusk for a sufficient length of time. The Dusk Qualify State utilizes several measurements taken over a period of time to ensure accuracy. If the required time period is met 106, the luminaire enters an ON Delay holding state in which the luminaire does not illuminate for a set amount of time to allow for all neighboring luminaires to transition through the Dusk Qualify state. After the programmed time has lapsed 108, the light turns on 109.

When the light turns on it immediately enters 110 the Measure Dawn Level Delay State 111. The system delays measuring 112 the light level to ensure that all neighboring lights are on. The system then measures the ambient light level to determine the contribution of all of the fixtures. This measurement serves as a baseline to calculate the dawn threshold level to then determine when the lights are to dim and/or turn off at dawn. After the measurement of the ambient light level from all neighboring luminaires occurs, the light transitions 114 to the On Wait for Dawn state 115.

During the On Wait for Dawn State the light measures the light level to determine if the sensed light level is greater than the dawn threshold. If the sensed light is greater than the dawn threshold level, the light enters the Dawn Qualify State 117. The Dawn Qualify State utilizes several measurements taken over a period of time to ensure accuracy. If the required time period is met 116, the luminaire enters an OFF Delay state in which the luminaire does not turn off for a programmed amount of time to allow for all neighboring luminaires to transition through the Dawn Qualify state. This delay allows for the ambient light level of each neighboring luminaire to be included in each luminaire's measurements during the Dawn Qualify state.

In a preferred embodiment the light level for determining dawn and dusk can be set to compensate for the delay to turn on. This allows for the luminaires to turn off at the appropriate time relative to dawn and dusk, as opposed to being delayed due to the delay states. More specifically, the light level required to initiate the Dawn Delay will be lower, whereas the light level to initiate the Dusk Delay will be set higher to allow.

Figure 2:
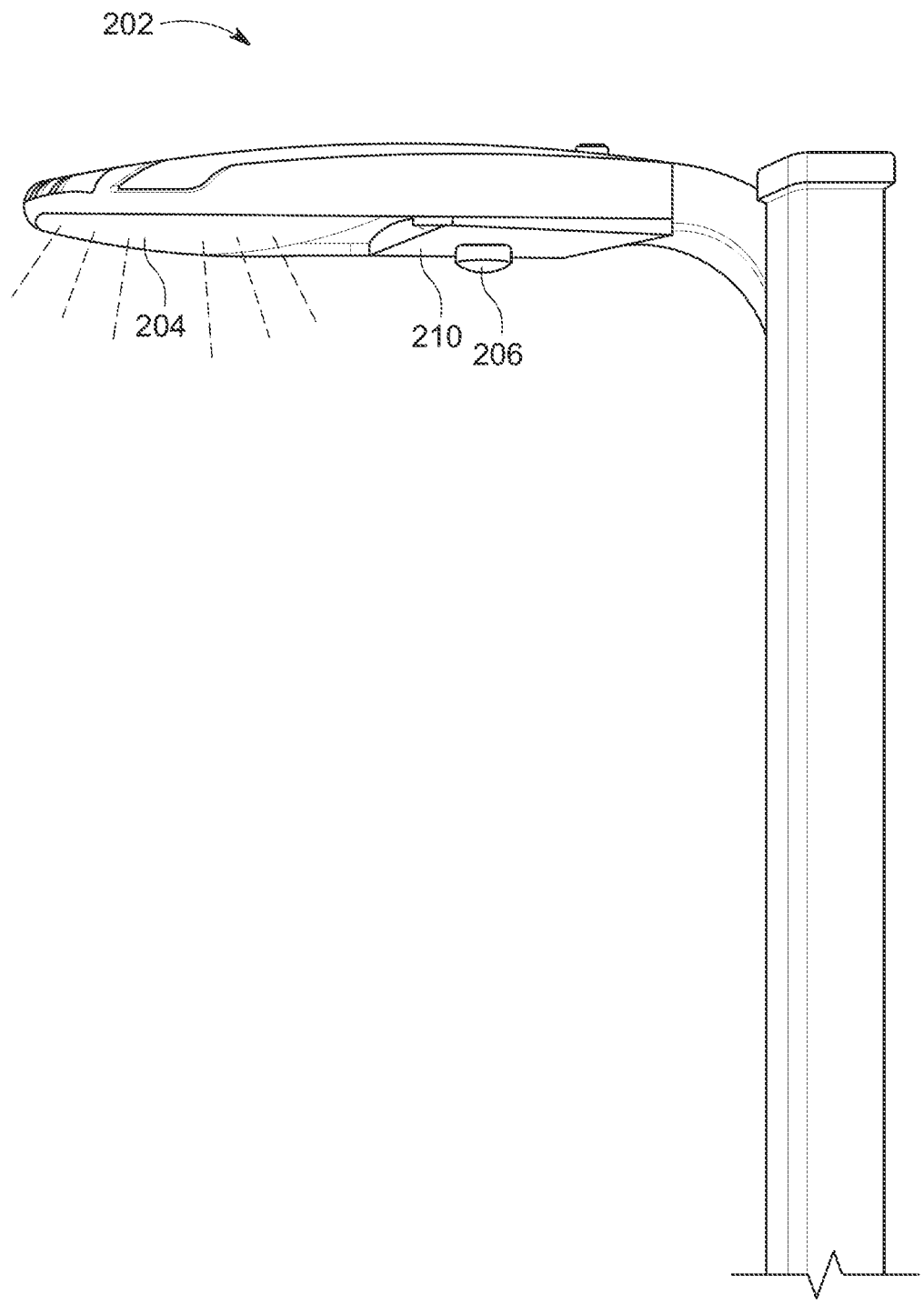
FIG. 2 illustrates an LED luminaire having an LED and a controller.

FIG. 2 illustrates an LED luminaire having an LED 204, a sensor 206, and a controller 210 configured to control the LED and to communicate with neighboring LED luminaires.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A light emitting diode (LED) luminaire, said luminaire comprising:
   at least one LED;
   an LED controller configured to control said at least one LED to turn on and turn off said at least one LED, wherein said LED controller is configured for communication with a controller of at least one neighboring luminaire;
   an ambient light sensor configured to detect the lux level of ambient light at said luminaire; and
   wherein said LED controller is configured to control said at least one LED in response to the measurement of the lux level of ambient light by said sensor in accordance with the following method:
   a) the step of calculating a threshold lux of ambient light to qualify a dawn event by measuring the lux of ambient light at said luminaire after a dusk event and adding it to a baseline measurement of ambient light signifying a dawn event, wherein the step of calculating the threshold lux further comprises said LED controller communicating with said neighboring luminaire to determine the state of the neighboring luminaire for including a lumen output of the neighboring luminaire in the lux of ambient light;
   b) the step of measuring the ambient lux of ambient light at intervals of time and comparing the measured lux to said threshold lux of ambient light; and
   c) the step of turning said LED off, or dimming said at least one LED once said measurement of ambient lux has met or exceeded the threshold lux.

2. The luminaire of claim 1, wherein said LED controller is configured to repeat said measurement of said ambient lux at an interval of time utilizing an interval timer to verify that the measurement of ambient lux has met or exceeded the threshold lux for a dawn event or has met or gone below the threshold lux for a dusk event, wherein said interval timer comprises at least one adjustable interval counter, wherein said interval counter is configured to control the interval of time between said step of repeating said measurement of said ambient lux at said interval of time to verify the measurement of ambient lux.

3. The luminaire of claim 1, wherein said LED controller comprises a motion sensor, where said LED controller is configured to turn on said at least one LED or increase brightness of said at least one LED in response to motion detected by said motion sensor.

4. The luminaire of claim 1, wherein said LED controller is configured to measure the ambient light lux at each dusk event, wherein said LED controller is configured to utilize each measurement of ambient light lux at each dusk event at the following dawn event.

5. The luminaire of claim 1, wherein said method by which said LED controller is configured to control said at least one LED further comprises the following step:

after said measurement of said ambient lux meets said threshold for measurements following multiple intervals of time, waiting for an interval of time before turning off and/or dimming said at least one LED.

6. The luminaire of claim 1, wherein said LED controller is configured to broadcast its state of on, off, or dimmed in response to a dawn or dusk condition to said neighboring luminaire.

7. The luminaire of claim 6, wherein said LED controller is configured to broadcast to said neighboring luminaire to direct said neighboring luminaire to illuminate prior to said LED controller determining said ambient lux for said dawn event.

8. The luminaire of claim 1, wherein said LED controller is configured to broadcast its status to the neighboring luminaire.

* * * * *